US008785570B2

(12) United States Patent
Bleys et al.

(10) Patent No.: US 8,785,570 B2
(45) Date of Patent: Jul. 22, 2014

(54) PROCESS FOR PREPARING A POLYISOCYANURATE POLYURETHANE MATERIAL

(75) Inventors: Gerhard Jozef Bleys, Heverlee (BE); Eric Huygens, Heverlee (BE); Stijn Roekaerts, Binkom (BE); Marc Vandervesse, Tienen (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 59 days.

(21) Appl. No.: 12/089,831

(22) PCT Filed: Sep. 29, 2006

(86) PCT No.: PCT/EP2006/066889
§ 371 (c)(1),
(2), (4) Date: Apr. 10, 2008

(87) PCT Pub. No.: WO2007/042411
PCT Pub. Date: Apr. 19, 2007

(65) Prior Publication Data
US 2008/0262168 A1     Oct. 23, 2008

(30) Foreign Application Priority Data

Oct. 13, 2005 (EP) .................................. 05109530

(51) Int. Cl.
C08G 18/00 (2006.01)
C08G 18/10 (2006.01)
C08G 18/09 (2006.01)
C08G 18/76 (2006.01)
C08G 18/48 (2006.01)

(52) U.S. Cl.
CPC .......... *C08G 18/092* (2013.01); *C08G 18/7671* (2013.01); *C08G 18/4837* (2013.01)
USPC ....................................................... 525/452

(58) Field of Classification Search
USPC .......................................... 525/452; 521/902
See application file for complete search history.

(56) References Cited

U.S. PATENT DOCUMENTS

| | | |
|---|---|---|
| 3,940,517 A | 2/1976 | DeLeon |
| 4,066,580 A | 1/1978 | Falkenstein et al. |
| 4,126,741 A | 11/1978 | Carleton et al. |
| 4,126,742 A | 11/1978 | Carleton et al. |
| 4,129,697 A | 12/1978 | Schapel et al. |
| 4,247,656 A | 1/1981 | Janssen et al. |
| 4,299,924 A * | 11/1981 | Nomura et al. ............... 521/131 |
| 4,379,105 A * | 4/1983 | Taylor et al. ................. 264/45.5 |
| 4,424,288 A | 1/1984 | Patton et al. |
| 4,661,533 A | 4/1987 | Stobby et al. |
| 4,871,612 A | 10/1989 | Okina et al. |
| 4,900,776 A | 2/1990 | Bock et al. |
| 5,137,929 A | 8/1992 | Demmin et al. |
| 5,232,957 A | 8/1993 | Pritchard et al. |
| 5,260,344 A | 11/1993 | Ashida et al. |
| 5,286,759 A | 2/1994 | Smits et al. |
| 5,346,928 A * | 9/1994 | De Vos et al. ................. 521/166 |
| 5,418,261 A | 5/1995 | Helsemans et al. |
| 5,556,934 A | 9/1996 | Hagquist et al. |
| 5,662,996 A | 9/1997 | Jourquin et al. |
| 5,900,442 A | 5/1999 | Leenslag et al. |
| 5,928,772 A | 7/1999 | Shiraishi et al. |
| 5,968,993 A | 10/1999 | Bleys |
| 6,031,010 A * | 2/2000 | Lin .................................. 521/51 |
| 6,444,720 B1 | 9/2002 | Klesczewski et al. |
| 6,509,392 B1 | 1/2003 | Jhaveri et al. |
| 6,624,283 B2 | 9/2003 | Viegas et al. |
| 6,713,167 B2 | 3/2004 | Di Sante et al. |
| 6,773,756 B2 | 8/2004 | Meyer-Ahrens et al. |
| 6,793,855 B2 | 9/2004 | Cheolas et al. |
| 6,800,667 B1 | 10/2004 | Kreyenschmidt et al. |
| 6,806,342 B2 | 10/2004 | Bleys et al. |
| 6,884,824 B2 | 4/2005 | Bleys et al. |
| 2002/0019452 A1 | 2/2002 | Roels et al. |
| 2002/0045690 A1 | 4/2002 | Cheolas et al. |
| 2004/0069971 A1 | 4/2004 | Witteveen et al. |
| 2004/0249078 A1 | 12/2004 | Bogdan et al. |
| 2005/0163969 A1 | 7/2005 | Brown |
| 2006/0084777 A1 | 4/2006 | Bleys et al. |
| 2008/0004361 A1 | 1/2008 | Palermo |

(Continued)

FOREIGN PATENT DOCUMENTS

| | | |
|---|---|---|
| DE | 10145458 | 4/2003 |
| DE | 10359024 | 7/2005 |

(Continued)

OTHER PUBLICATIONS

Definition of "Solid" from Hawley's Condensed Chemical Dictionary. 2002. John Wiley& Sons, Inc. 14th Edition.*

(Continued)

*Primary Examiner* — Kara Boyle
(74) *Attorney, Agent, or Firm* — Robert A. Diaz

(57) ABSTRACT

A process for preparing a polyisocyanurate polyurethane material, which process comprises reacting a polyisocyanate and an isocyanate-reactive composition, wherein the reaction is conducted at an isocyanate index of 1600 to 100,000 and in the presence of a trimerization catalyst, wherein the polyisocyanate comprises a) 75-100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 25-0% by weight of another polyisocyanate (polyisocyanate b), the amount of polyisocyanate a) and polyisocyanate b) being calculated on the total amount of this polyisocyanate a) and polyisocyanate b), and wherein the isocyanate-reactive composition comprises a) 80-100% by weight of a polyether polyol having an average nominal functionality of 2-6, an average equivalent weight of 1100-5000 and an oxyethylene (EO) content of 65-100% by weight and b) 20-0% by weight of one or more other isocyanate-reactive compounds, the amount of polyol a) and isocyanate-reactive compound b) being calculated on the total amount of this polyol a) and compound b).

12 Claims, No Drawings

(56) References Cited

U.S. PATENT DOCUMENTS

| | | |
|---|---|---|
| 2008/0227929 A1 | 9/2008 | Jozef et al. |
| 2008/0262168 A1 | 10/2008 | Bleys et al. |
| 2009/0005517 A1 | 1/2009 | Bleys et al. |

FOREIGN PATENT DOCUMENTS

| | | | |
|---|---|---|---|
| EP | 226176 A | 6/1987 | |
| EP | 304005 A | 2/1989 | |
| EP | 587317 | 3/1994 | |
| EP | 608626 | 8/1994 | |
| EP | 745627 | 12/1996 | |
| EP | 830419 A | 3/1998 | |
| EP | 922063 | 3/1998 | |
| EP | 1173495 | 1/2002 | |
| EP | 1178097 A | 2/2002 | |
| EP | 1199154 A | 4/2002 | |
| EP | 1346819 A | 9/2003 | |
| EP | 1428848 | 6/2004 | |
| GB | 1433642 | 4/1976 | |
| GB | 1491620 | 11/1977 | |
| JP | 62-101622 | 12/1987 | |
| JP | 05-140257 | 6/1993 | |
| JP | 06-199977 | 7/1994 | |
| WO | WO 98/00450 | 1/1998 | |
| WO | WO 00/29459 | 5/2000 | |
| WO | WO 02/00752 | 1/2002 | |
| WO | WO 02/06370 | 1/2002 | |
| WO | WO 02/10249 | 2/2002 | |
| WO | WO2004/111101 | 12/2004 | |
| WO | WO 2004111101 A1 * | 12/2004 | C08G 18/09 |
| WO | WO2005/072188 | 8/2005 | |
| WO | WO 2006/008780 A | 1/2006 | |
| WO | WO 2007/042407 A | 4/2007 | |
| WO | WO 2007/042411 A | 4/2007 | |
| WO | WO 2007/096216 A | 8/2007 | |

OTHER PUBLICATIONS

G. Woods, The ICI Polyurethanes Book, 1990, 2nd edition, p. 32-35.

* cited by examiner

PROCESS FOR PREPARING A POLYISOCYANURATE POLYURETHANE MATERIAL

CROSS REFERENCE TO RELATED APPLICATIONS

This application is the National Phase of International Application PCT/EP2006/066889 filed Sep. 29, 2006 which designated the U.S. and which claimed priority to European (EP) Pat. App. No. 05109530.5 filed Oct. 13, 2005. The noted applications are incorporated herein by reference.

The present invention is related to a process for preparing a polyisocyanurate polyurethane material.

More specifically the present invention is related to a process for preparing a polyisocyanurate polyurethane material using a polyether polyol having a high oxyethylene content and a polyisocyanate having a high diphenylmethane diisocyanate (MDI) content.

The preparation of polyurethane materials having a low and a high hardblock content from polyols having a high oxyethylene content, polyisocyanates comprising at least 85% by weight of 4,4'-MDI or a variant thereof and water has been disclosed in WO 02/06370 and WO 98/00450. The materials made are polyurethane elastomers. Further it has been disclosed in EP 608626 to produce shape memory polyurethane foams by reacting a polyisocyanate comprising a high amount of 4,4'-MDI and a polyol with a high oxyethylene content with water. WO 02/10249 discloses a process for preparing a polyurethane material having a high hard block content by reacting an MDI, a polyol having a high oxyethylene content and a cross-linker/chain extender.

These citations do not disclose a process for making a polyisocyanurate polyurethane material by reacting a polyisocyanate and a polyol at a high NCO-index and in the presence of a trimerisation catalyst.

Processes for making polyisocyanurate polyurethane materials, by reacting polyisocyanates and polyols at a high index in the presence of a trimerisation catalyst, as such have been widely described. See e.g. EP 922063 and WO 00/29459, WO 02/00752, EP 1173495, EP 745627, EP 587317, U.S. Pat. No. 4,247,656, U.S. Pat. No. 4,129,697, DE 10145458, U.S. Pat. No. 4,661,533, U.S. Pat. No. 4,424,288, U.S. Pat. No. 4,126,742, GB 1433642 and EP 1428848.

WO 05/072188 discloses a polymer matrix composite material which optionally may comprise polyisocyanurate formed by reaction of a monomeric or oligomeric poly- or di-isocyanate with water.

WO 04/111101 discloses polyisocyanurate polyurethane materials prepared from certain MDI-based polyisocyanates and certain polyols having a high oxyethylene content. The materials are prepared at an isocyanate index of 150 to 1500.

It is known that materials made at a higher index tend to show a higher bittleness which restricts their suitability in practice. Surprisingly it has now been found that the good properties of polyisocyanurate materials which have been made at a high index can be retained while their brittleness is not deteriorated (increased) when polyether polyols are used which have a high oxyethylene content.

The invention allows for the production of materials having a high modulus, a high impact-, temperature- and flammability resistance, a short demould time and a high green strength. Softening of the material takes place at a higher temperature. In particular the materials can be advantageously produced according to the reaction injection moulding (RIM) process or casting process.

Further, the process is suitable to make reinforced materials by using fillers like organic, mineral and nano particles like carbon black particles, nanoclay particles and silicates, $BaSO_4$, $CaCO_3$ and metal oxides and/or fibers like glass fibers, natural fibers like flax, hemp and sisal fibers, synthetic fibers like polyethylene terephthalates, polyamides, polyaramides (Kevlar™) and carbon fibers. Such materials exhibit a good thermal stability.

Still further the ingredients used to make the materials are easily processable and exhibit excellent curing characteristics allowing for short demould times.

Still further, immediately after their preparation, the materials obtained show lower levels of residual NCO groups in infra-red analysis compared to materials made from high amounts of polyols having a high level of oxypropylene groups at the same NCO-index and hardblock content. The materials according to the present invention retain good impact properties and low brittleness.

Therefore the present invention is concerned with a process for preparing a polyisocyanurate polyurethane material which process comprises reacting a polyisocyanate and an isocyanate-reactive composition wherein the reaction is conducted at an isocyanate index of 1600 to 100,000 and in the presence of a trimerisation catalyst, wherein the polyisocyanate comprises a) 75-100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant is liquid at 25° C. and has an NCO value of at least 20% by weight (polyisocyanate a), and b) 25-0% by weight of another polyisocyanate (polyisocyanate b), the amount of polyisocyanate a) and polyisocyanate b) being calculated on the total amount of this polyisocyanate a) and polyisocyanate b), and wherein the isocyanate-reactive composition comprises a) 80-100% by weight of a polyether polyol having an average nominal functionality of 2-6, an average equivalent weight of 1100-5000, an oxyethylene (EO) content of 65-100% by weight, and b) 20-0% by weight of one or more other isocyanate-reactive compounds, the amount of polyol a) and compound b) being calculated on the total amount of this polyol a) and compound b), and wherein the hardblock content is at least 50%.

In the context of the present invention the following terms have the following meaning:
1) isocyanate index or NCO index or index:
the ratio of NCO-groups over isocyanate-reactive hydrogen atoms present in a formulation, given as a percentage:

$$\frac{[NCO] \times 100}{[active\ hydrogen]}\ (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyisocyanurate polyurethane material" as used herein refers to cellular or non-cellular products as obtained by reacting the mentioned polyisocyanates and isocyanate-reactive compositions in the presence of trimerization catalysts at a high index, optionally using foaming agents, and in particular includes cellular products obtained with water as reactive foaming agent (involving a reaction of water with isocyanate groups yielding urea linkages and carbon dioxide and producing polyurea-polyisocyanurate-polyurethane foams).

5) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) The term "hard block content" refers to 100× the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+ all isocyanate-reactive materials used.

Preferably the polyisocyanate a) is selected from 1) a diphenylmethane diisocyanate comprising at least 40%, preferably at least 60% and most preferably at least 85% by weight of 4,4'-diphenylmethane diisocyanate (4,4'-MDI) and the following preferred variants of such diphenylmethane diisocyanate; 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a prepolymer having an NCO value of 20% by weight or more and which is the reaction product of an excess of any of the aforementioned polyisocyanates 1-3) and of a polyol having an average nominal hydroxyl functionality of 2-6, an average molecular weight of 2000-12000 and preferably an hydroxyl value of 15 to 60 mg KOH/g, and 5) mixtures of any of the aforementioned polyisocyanates. Polyisocyanates 1) and 2) and mixtures thereof are preferred as polyisocyanate a).

Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec™ MPR ex Huntsman Polyurethanes, which is a business of Huntsman International LLC (who owns the Suprasec trademark).

The carbodiimide and/or uretonimine modified variants of the above polyisocyanate 1) are also known in the art and commercially available; e.g. Suprasec 2020, ex Huntsman Polyurethanes.

Urethane modified variants of the above polyisocyanate 1) are also known in the art, see e.g. The ICI Polyurethanes Book by G. Woods 1990, $2^{nd}$ edition, pages 32-35. Aforementioned prepolymers of polyisocyanate 1) having an NCO value of 20% by weight or more are also known in the art. Preferably the polyol used for making these prepolymers is selected from polyester polyols and polyether polyols and especially from polyoxyethylene polyoxypropylene polyols having an average nominal hydroxyl functionality of 2-4, an average molecular weight of 2500-8000, and preferably an hydroxyl value of 15-60 mg KOH/g and preferably either an oxyethylene content of 5-25% by weight, which oxyethylene preferably is at the end of the polymer chains, or an oxyethylene content of 50-90% by weight, which oxyethylene preferably is randomly distributed over the polymer chains.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec 2021 ex Huntsman Polyurethanes.

The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

When polyisocyanates are used which have an NCO functionality of more than 2, the amount of such polyisocyanate used is such that the average NCO functionality of the total polyisocyanate used in the present invention is at most 2.2 preferably.

Polyether polyol a) having a high EO content is selected from those having an EO content of 65-100 and preferably of 65-90% by weight calculated on the weight of the polyether polyol. These polyether polyols may contain other oxyalkylene groups like oxypropylene and/or oxybutylene groups. These polyols have an average nominal functionality of 2-6 and more preferably of 2-4, an average equivalent weight of 1100-5000 and preferably of 1100-4000. If the polyol contains oxyethylene groups and another oxyalkylene group like oxypropylene, the polyol may have a random distribution of the oxyalkylene groups, a block copolymer distribution or a combination thereof. Mixtures of polyols may be used. Preferably they are used in an amount of 90-100% by weight.

The other isocyanate-reactive compounds b), which may be used in an amount of 0-20% by weight and preferably of 0-10% by weight, calculated on the amount of polyol a) and this compound b), may be selected from chain extenders, cross-linkers, polyether polyamines, polyols different from polyol a) and water.

The isocyanate-reactive chain extenders, which have 2 isocyanate-reactive hydrogen atoms, may be selected from amines, amino-alcohols and polyols; preferably polyols are used. Further the chain extenders may be aromatic, cycloaliphatic, araliphatic and aliphatic; preferably aliphatic ones are used. The chain extenders preferably have an average equivalent weight of less than 150. Most preferred are aliphatic diols such as ethylene glycol, 1,3-propanediol, 2-methyl-1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 2,2-dimethyl-1,3-propanediol, diethylene glycol, dipropylene glycol and tripropylene glycol, and aromatic diols and propoxylated and/or ethoxylated products thereof. The cross-linkers are isocyanate-reactive compounds containing 3-8 isocyanate-reactive hydrogen atoms and, preferably, having an average equivalent weight of less than 150. Examples of such cross-linkers are glycerol, trimethylolpropane, pentaerythritol, triethanolamine, polyoxyethylene polyols having an average nominal functionality of 3-8 and an average equivalent weight of less than 150 like ethoxylated glycerol, trimethylol propane, pentaerythritol, sucrose and sorbitol having said equivalent weight, and polyether triamines having said equivalent weight.

Polyether polyamines may be selected from polyoxypropylene polyamines, polyoxyethylene polyamines and polyoxypropylene polyoxyethylene polyamines, preferably having an equivalent weight of 150-3000 (number average molecular weight divided by the number of amine groups at the end of the polymer claims). Such polyether polyamines are known in the art. Examples are Jeffamine® ED2003 and T5000 obtainable from Huntsman.

Still further the other isocyanate-reactive compounds may be selected from polyols which are polyesters, polyesteramides, polythioethers, polycarbonates, polyacetals, polyolefins, polysiloxanes or polyethers (different form polyol a)). Polyester polyols which may be used include hydroxyl-terminated reaction products of dihydric alcohols such as ethylene glycol, propylene glycol, diethylene glycol, 1,4-butanediol, neopentyl glycol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polythioether polyols, which may be used, include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or teraethylene glycol with diaryl carbonates, for example diphenyl carbonate, or with phosgene. Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols.

Polyether polyols different from polyol a) have an EO content of less than 65% by weight and preferably have an average equivalent weight of 150-4000 and more preferably of 150-2500 and preferably have an average functionality of 2-4. Such polyols include polyoxyethylenepolyoxypropylene polyols, wherein the oxyethylene and oxypropylene units are distributed randomly, in block form or a combination thereof, and polyoxypropylene polyols. Such polyols are widely known. An example is Daltocel® F428 obtainable ex Huntsman.

Mixtures of the aforementioned other isocyanate-reactive compounds may be used as well. Preferably the other isocyanate-reactive compounds are polyols selected from the above preferred ones.

The polyols may comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine, in the above polyol. Polyoxyalkylene polyols containing from 1 to 50% of dispersed polymer are particularly useful. Particle sizes of the dispersed polymer of less than 50 microns are preferred.

Still further the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; foam stabilisers like siloxane-oxyalkylene copolymers; fire retardants; smoke suppressants; UV-stabilizers; colorants; microbial inhibitors; organic and inorganic fillers, impact modifiers, plasticizers and internal mould release agents. Further external mould release agents may be used in the process according to the present invention.

Any compound that catalyses the isocyanate trimerisation reaction (isocyanurate-formation) can be used as trimerisation catalyst in the process according to the present invention, such as tertiary amines, triazines and most preferably metal salt trimerisation catalysts.

Examples of suitable metal salt trimerisation catalysts are alkali metal salts of organic carboxylic acids. Preferred alkali metals are potassium and sodium, and preferred carboxylic acids are acetic acid and 2-ethylhexanoic acid.

Most preferred metal salt trimerisation catalysts are potassium acetate (commercially available as Polycat 46 from Air Products and Catalyst LB from Huntsman Polyurethanes) and potassium 2-ethylhexanoate (commercially available as Dabco K15 from Air Products). Two or more different metal salt trimerisation catalysts can be used in the process of the present invention.

The metal salt trimerisation catalyst is generally used in an amount of up to 5% by weight based on the isocyanate-reactive composition, preferably 0.001 to 3% by weight. It may occur that the polyol used in the process according to the present invention still contains metal salt from its preparation which may then be used as the trimerisation catalyst or as part of the trimerisation catalyst.

The polyurethane material may be a solid or blown (microcellular) material. Microcellular materials are obtained by conducting the reaction in the presence of a blowing agent, like hydrocarbons, hydrofluorocarbons, hydrochlorofluorocarbons, gases like $N_2$ and $CO_2$, and water. Most preferably water is used as the blowing agent. The amount of blowing agent will depend on the desired density. The amount of water will be less than 5, preferably less than 3 and most preferably less than 1% by weight; calculated on the weight of the isocyanate-reactive composition. In calculating the amount of the other isocyanate-reactive compounds b), this amount of water is included. Density reduction may also be achieved by the incorporation of expanded or expandable microspheres like Expancel® or hollow microbeads or by incorporation of decomposing salts like azodicarbonamide.

The reaction to prepare the material is conducted at an NCO index of 1600-100,000 and preferably of 1700-50,000.

The hard block content is at least 50% and preferably 55-90%.

The density of the materials is preferably higher than 100 kg/m$^3$.

The materials are preferably made in a mould. The process may be conducted in any type of mould known in the art. Examples of such moulds are the moulds commercially used for making shoe parts like soccer shoes and ski- and skate boots, automotive parts, like arm-rests, door panels and back-shelves. Preferably the reaction is conducted in a closed mould. The ingredients used for making the material are fed into the mould at a temperature of from ambient temperature up to 90° C., the mould being kept at a temperature of from ambient temperature up to 150° C. during the process. Demoulding time is relatively short despite the fact that preferably no isocyanate-reactive compounds, containing reactive amine groups, are used; depending on the amount of catalyst demould times may be below 10 minutes, preferably below 5 minutes, more preferably below 3 minutes and most preferably below 1 minute.

The moulding process may be conducted according to the reaction injection moulding (RIM) process and the cast moulding process. The process may also be conducted according to the RRIM (reinforced RIM) and SRIM (structural RIM) process and the resin transfer moulding process. Alternatively extrusion processes can be used as well as spraying processes.

In general, the isocyanate-reactive ingredients and catalysts may be pre-mixed, optionally together with the optional ingredients, before being brought into contact with the polyisocyanate.

The materials according to the invention are particularly suitable for use in applications where high stiffness, non-brittle, high impact resistant and low density materials are desirable, like soccer shoe soles and ski-boots, and automotive parts like doorpanels, back-shelves, sun visors and reinforced or structural composites like synthetic and/or blown foams, for insulation purposes including pipe insulation especially for off-shore use and for construction and heat insulation purposes.

The present invention is illustrated by the following examples.

EXAMPLES 1-3

Suprasec 2015* and Daltocel F555** were dispensed into a mould (dispensing machine Krauss Maffei Comet 2020 high pressure piston machine, output was 300 g/s). The mould was a steel mould having dimensions 30×60×0.5 cm and mounted in a Battenfeld press.

The temperature of the chemicals and of the mould was 35 and 85° C., respectively. Before use, the mould was treated with Acmos 35-5015 mould release agent. Demould time was 60 seconds. The amounts (in parts by weight) used and the physical properties of the polyisocyanurate polyurethane parts are given in below table.

* Suprasec 2015, obtainable ex Huntsman and which is a polyisocyanate according to the present invention. Suprasec 2015 has an NCO-value of 27.4% by weight. Suprasec is a trademark of Huntsman.

** A polyoxyethylene polyoxypropylene polyol having an average nominal functionality of 3, an equivalent weight of 2000 and an EO-content of 75% by weight. To the polyol 0.4% by weight of catalyst LB ex Huntsman was added.

| Example | 1 | 2 | 3 |
|---|---|---|---|
| Suprasec 2015 | 60 | 70 | 75 |
| Daltocel F555 (including catalyst) | 40 | 30 | 25 |
| Hardblock content, % | 60 | 70 | 75 |
| Flex modulus (MPa), ISO 14125 | 860 | 1700 | 2200 |
| Unnotched IZOD Impact strenght (kJ/m), ISO 180 | 74 | 59 | 30 |
| Index | 1968 | 3061 | 3936 |

The invention claimed is:

1. A method for preparing a solid moulded polyisocyanurate polyurethane material having a density of more than 100 kg/m$^3$ without the use of a blowing agent, the method comprising: (a) dispensing (i) a polyisocyanate, (ii) an isocyanate-reactive composition, and (iii) a trimerisation catalyst into a mould; (b) reacting the polyisocyanate and the isocyanate-reactive composition at an isocyanate index of 1600 to 100,000 in the presence of the trimerisation catalyst to form the solid polyisocyanurate polyurethane material; and (c) removing the solid polyisocyanurate polyurethane material from the mould, wherein said polyisocyanate comprises:
polyisocyanate (a), which comprises 75-100% by weight of diphenylmethane diisocyanate, at least 40% by weight of said diphenylmethane diisocyanate comprising 4,4'-diphenylmethane diisocyanate, or a variant of diphenylmethane diisocyanate that is liquid at 25° C. and has an NCO value of at least 20% by weight, or both, and
polyisocyanate (b), which comprises 25-0% by weight of another polyisocyanate, the amount of polyisocyanate (a) and polyisocyanate (b) calculated on the total amount of this polyisocyanate (a) and polyisocyanate (b);
and wherein said isocyanate-reactive composition consisting of 80-100% by weight of a polyether polyol and 20-0% by weight of one or more other isocyanate reactive compounds, said polyether polyol having an average nominal functionality of 2-6, an average equivalent weight of 1100-5000, and an oxyethylene (EO) content of 65-100% by weight, the amount of the polyether polyol and the one or more other isocyanate reactive compounds being calculated on the total amount of this polyether polyol and the other isocyanate reactive compound, and wherein the hardblock content of the polyisocyanurate polyurethane material is at least 50%; and
wherein when the one or more other isocyanate reactive compounds is present, the one or more other isocyanate reactive compounds consists of a chain extender, a cross-linker, a polyether polyamine, and a polyol different from the polyether polyol.

2. The method according to claim 1 wherein the isocyanate index is 1700 to 50,000 and the equivalent weight is 1100 to 4000.

3. The process according to claim 1 wherein the oxyethylene content is 65% to 90% by weight, the amount of the polyether polyol is 90% to 100% by weight, and the amount of the other isocyanate reactive compound is 0-10% by weight.

4. A method for preparing a non-cellular solid moulded polyisocyanurate polyurethane material having a density of more than 100 kg/m$^3$ without the use of a blowing agent, the method comprising (a) dispensing (i) a polyisocyanate, (ii) an isocyanate-reactive composition, and (iii) a trimerisation catalyst into a mould; (b) reacting the polyisocyanate and the isocyanate-reactive composition at an isocyanate index of 1600 to 100,000 in the presence of the trimerisation catalyst to form the solid polyisocyanurate polyurethane material, and (c) removing the solid polyisocyanurate polyurethane material from the mould, wherein said polyisocyanate comprises:

polyisocyanate (a), which comprises 75-100% by weight of diphenylmethane diisocyanate, at least 40% by weight of said diphenylmethane diisocyanate comprising 4,4'-diphenylmethane diisocyanate, or a variant of diphenylmethane diisocyanate that is liquid at 25° C. and has an NCO value of at least 20% by weight, or both, and polyisocyanate (b), which comprises 25-0% by weight of another polyisocyanate, the amount of polyisocyanate (a) and polyisocyanate (b) calculated on the total amount of this polyisocyanate (a) and polyisocyanate (b);

and wherein said isocyanate-reactive composition comprising 80-100% by weight of a polyether polyol and 20-0% by weight of one or more other isocyanate reactive compounds, said polyether polyol having an average nominal functionality of 2-6, an average equivalent weight of 1100-5000, and an oxyethylene (EO) content of 65-100% by weight, the amount of the polyether polyol and the one or more other isocyanate reactive compounds being calculated on the total amount of this polyether polyol and the other isocyanate reactive compound, and wherein the hardblock content of the polyisocyanurate polyurethane material is at least 50%.

5. The process according to claim 4, wherein the oxyethylene content is 65% to 90% by weight, the amount of the polyether polyol is 90% to 100% by weight, and the amount of the other isocyanate reactive compound is 0-10% by weight.

6. A material made according to the method of claim 1.

7. A method for preparing a solid moulded polyisocyanurate polyurethane material having a density of more than 100 kg/m³ without the use of a blowing agent, the method consisting of (a) dispensing (i) a polyisocyanate, (ii) an isocyanate-reactive composition, and (iii) a trimerisation catalyst into a mould; and (b) reacting the polyisocyanate and the isocyanate-reactive composition at an isocyanate index of 1600 to 100,000 in the presence of the trimerisation catalyst to form the solid polyisocyanurate polyurethane material, and (c) removing the solid polyisocyanurate polyurethane material from the mould, wherein said polyisocyanate comprises:

polyisocyanate (a), which comprises 75-100% by weight of diphenylmethane diisocyanate, at least 40% by weight of said diphenylmethane diisocyanate comprising 4,4'-diphenylmethane diisocyanate, or a variant of diphenylmethane diisocyanate that is liquid at 25° C. and has an NCO value of at least 20% by weight, or both, and polyisocyanate (b), which comprises 25-0% by weight of another polyisocyanate, the amount of polyisocyanate (a) and polyisocyanate (b) calculated on the total amount of this polyisocyanate (a) and polyisocyanate (b), said isocyanate-reactive composition consisting of a polyether polyol, wherein said polyether polyol has an average nominal functionality of 2-6, an average equivalent weight of 1100-5000, and an oxyethylene (EO) content of 65-100% by weight, and wherein the hardblock content of the solid polyisocyanurate polyurethane material is at least 50%.

8. The process according to claim 4, wherein when the one or more other isocyanate is present, the one or more other isocyanate reactive compounds consists of a chain extender, a cross-linker, a polyether polyamine, and a polyol different from the polyether polyol.

9. The process according to claim 8, wherein the isocyanate-reactive composition consists of 80-100% by weight of the polyether polyol and 20-0% by weight of the one or more other isocyanate reactive compounds.

10. The process according to claim 1, wherein the trimerisation catalyst comprises a metal salt trimerisation catalyst.

11. The process according to claim 4, wherein the trimerisation catalyst comprises a metal salt trimerisation catalyst.

12. The process according to claim 7, wherein the trimerisation catalyst comprises a metal salt trimerisation catalyst.

* * * * *